J. LONG.
Plow-Colter.
No. 34,893.
Patented Apr 8, 1862.
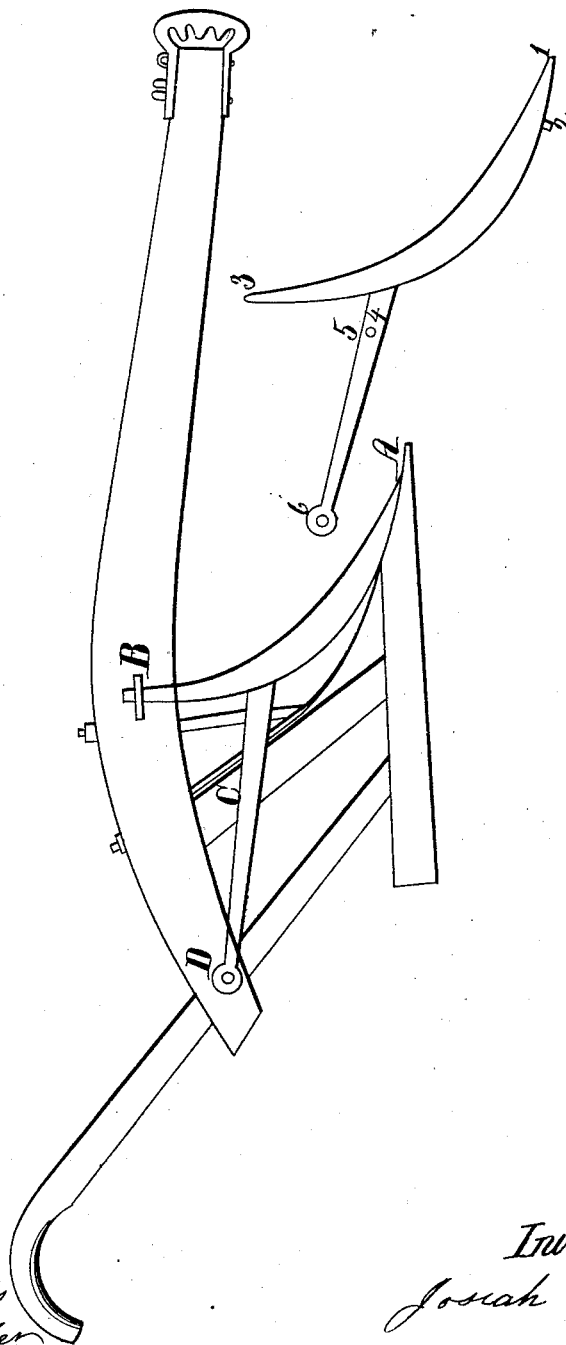
Witnesses;
J. M. Lemonds
P. M. Overbacker
Inventor;
Josiah Long

UNITED STATES PATENT OFFICE.

JOSIAH LONG, OF LEAVENWORTH, INDIANA.

IMPROVED CUTTER ATTACHMENT TO PLOWS.

Specification forming part of Letters Patent No. 34,893, dated April 8, 1862.

*To all whom it may concern:*

Be it known that I, JOSIAH LONG, of Leavenworth, in the county of Crawford and State of Indiana, have invented a new and useful Improvement on the Cutter Attachment to a Plow; and I do hereby declare that the following is a full, clear, and exact description of the construction and operation of the same, reference being had to the annexed drawings, which are made a part of this specification.

Figure 1 is the point of the cutter, which sits in a groove in the point of the plow at letter A on drawings of the plow; Fig. 2, a peg or spur which sits in the point of the plow to hold the cutter to its place; Fig. 3, the upper point of the cutter, over which is a staple at letter B, as shown on the drawings of the plow. The object of a staple instead of a bolt is to give the cutter play in case of a strong surge on the beam, and thus prevent it from drawing out at the point. Fig. 4, a brace running from the cutter to where the handle of the plow crosses the beam at letter D, as shown on drawings of the plow; Fig. 5, a place to put a bolt through the brace of the cutter and through the upright shaft of the plow at letter C, as shown on the drawings of the plow; Fig. 6, a place to put a bolt through the upper end of the brace and through the handle and beam of the plow at letter D on the drawings of the plow. This bolt should be drawbored, so as to force the point of the cutter to its place.

The peculiar merits of my invention are substantially as follows:

First, my cutter, running back with a curve, by drawing across instead of pushing through, will cut a root of twice the size and with greater ease than will the ordinary cutter which sits upright.

Second, the ordinary cutter which sits upright is continually catching grass and weeds, and requires frequent cleaning; but my cutter obviates this difficulty by the point sitting in a groove, and is also kept clean by the furrow rubbing against it as it rises on the mold-board.

Third, it prevents the shim of the plow from wearing, and for that reason alone is valuable. It is adapted to either roots or sod. It should, however, be sufficiently raised from the shim of the plow to let the dirt pass through freely to prevent it from packing.

Fourth, the brace above referred to forms a substantial support to the whole plow.

What I claim as my invention, and desire to secure by Letters Patent, is—

The cutter, constructed as above described, attached to the plow, as and for the purposes set forth in the foregoing specification.

JOSIAH LONG.

Witnesses:
J. M. LEMANDS,
PETER M. ONERBACKER.